United States Patent [19]

Pelly

[11] 3,825,814
[45] July 23, 1974

[54] ACTIVE FILTER FOR THE INPUT HARMONIC CURRENT OF STATIC POWER CONVERTERS

[75] Inventor: Brian R. Pelly, Murrysville, Pa.

[73] Assignee: Westinghouse Electric Corporation, Pittsburgh, Pa.

[22] Filed: May 29, 1973

[21] Appl. No.: 364,451

[52] U.S. Cl. .................. 321/9 A, 321/10, 321/18
[51] Int. Cl. ............................................. H02m 1/12
[58] Field of Search ......... 321/9 R, 10, 9 A, 16, 18; 323/79

[56] References Cited
UNITED STATES PATENTS

| | | |
|---|---|---|
| 3,636,430 | 1/1972 | Kernick et al. .................. 321/9 A |
| 3,648,150 | 3/1972 | Kernick et al. .................. 321/9 A |
| 3,670,230 | 6/1972 | Rooney et al. .................. 321/10 |
| 3,761,797 | 9/1973 | Spooner .......................... 321/10 |

Primary Examiner—Gerald Goldberg
Attorney, Agent, or Firm—J. J. Wood

[57] ABSTRACT

An active filter for the input harmonic currents of static power converters comprising an active harmonic voltage generator connected in series with a passive reactive element, the series combination being connected across the converter input terminals. The passive reactive element is such that essentially the full-line voltage appears across the passive reactive element whereby the volt-ampere rating of the active harmonic voltage generator can be materially reduced.

8 Claims, 6 Drawing Figures

PATENTED JUL 23 1974 3,825,814
SHEET 1 OF 2

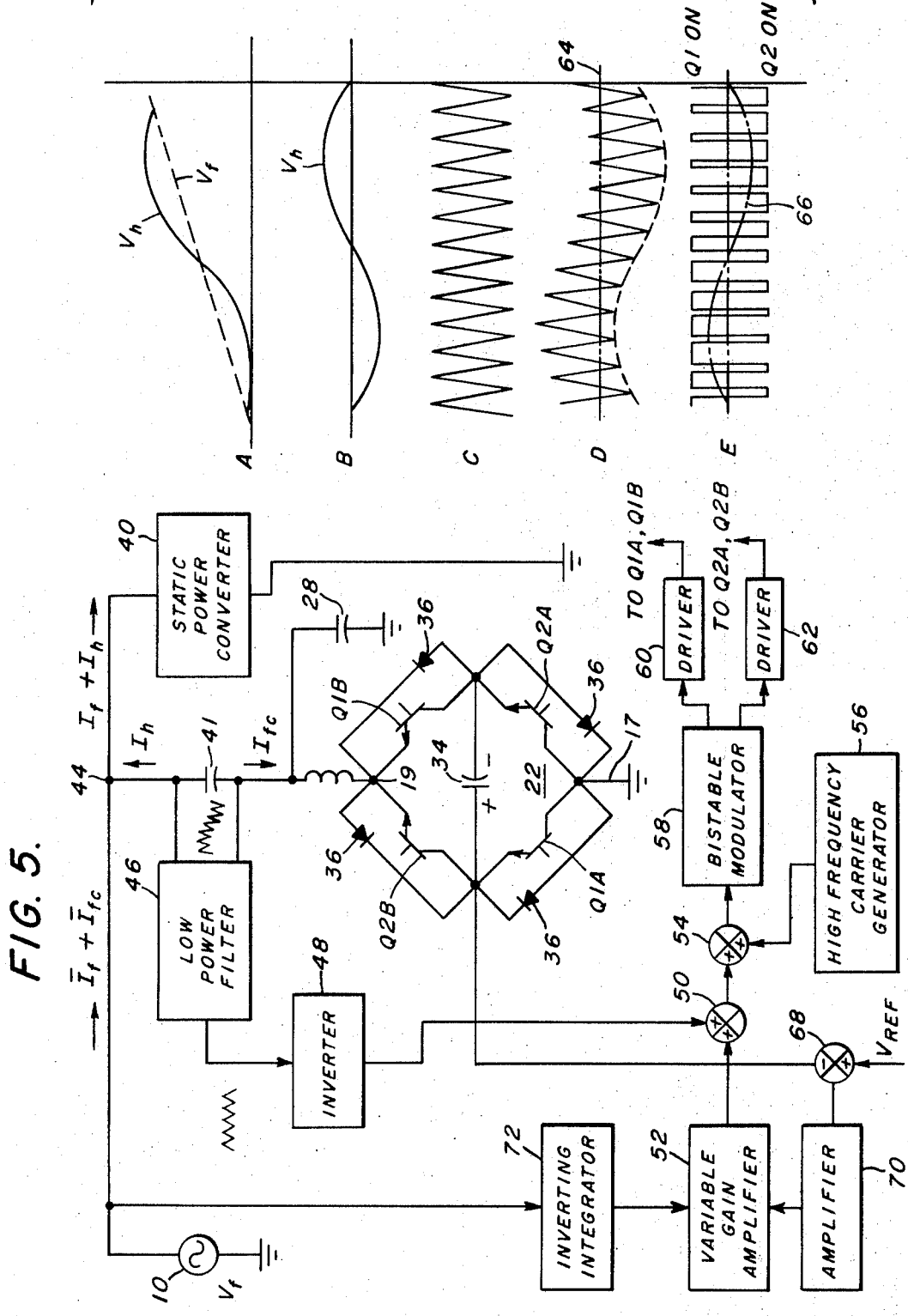

ACTIVE FILTER FOR THE INPUT HARMONIC CURRENT OF STATIC POWER CONVERTERS

CROSS-REFERENCES TO RELATED APPLICATIONS

This application covers a modification of the invention described and claimed in copending application, Ser. No. 369,333, filed June 12, 1973 pending in Gp. 212 and assigned to the Assignee of the present application.

BACKGROUND OF THE INVENTION

A feature of most AC to DC, DC to AC, and AC to AC static power converters which are fed from an alternating current line is that they draw harmoic currents at the line terminals, in addition to the fundamental component. In some applications it is not permissible or desirable for these harmonic currents to flow through the source.

The conventional method for filtering input current harmonics is to provide low impedance shunt paths for the harmonics across the converter input terminals. These low impedance paths consist of several series-tuned circuits, one for each of the principal harmonic components. Additionally, usually a "high-pass" shunt, consisting basically of a capacitor, is provided across the input terminals for the higher order harmonic currents.

While the conventional filtering approach described above has been used extensively, it has several disadvantages. Firstly, the filters are physically large. In applications where space is restricted, this can be a severe limitation. Secondly, in order to accommodate variations in the line frequency, as well as tolerances and long-term variations in the values of the components of the filters themselves, it is necessary either to design the filters to have a relatively "flat" response, which increases size and losses, or to complicate the design by making the filters self-tuning. For high power, high voltage direct current converters, for example, an arrangement of mechanically moving tuning coils is sometimes used, the relative positions of the coils being altered by means of a servomotor so as to control the inductance and keep the filter properly tuned. Thirdly, for high power converters in particular, harmonic filters are difficult to design and their performance is difficult to predict because of the complex and often unknown impedance characteristics of the system to which the converters are to be connected. Thus, it is quite possible for unexpected resonance conditions to occur in a system to which a high voltage direct current converter is connected. Such problems often only can be solved in the field by studying the operation of the actual working system itself. Finally, it is possible under transient conditions for excessive levels of voltage and/or current to be produced by conventional passive filter networks.

SUMMARY OF THE INVENTION

In accordance with the present invention, an active filter for the input harmonic currents of a static power converter is provided which eliminates the disadvantages of prior art filters described above.

In copending application, Ser. No. 369,333, filed June 12, 1973 and assigned to the Assignee of the present application, active power filters are described which are interposed between an alternating current source section and a load section for generating a fictitious ripple which opposes and effectively eliminates an electrical ripple generated in one of the sections, either the source or the load. In the preferred embodiments of the invention described in that application, the fictitious ripple is generated by direct current storage elements such as inductors or capacitors, the charge on these elements being obtained and maintained from one source by appropriate control, and static semiconductor switches rated to handle only the ripple components.

While theoretically feasible, the direct application of the active power filters described in the aforesaid copending application, Ser. No. 369,333 to filtering of input harmonic currents for static converters results in a required volt-ampere handling capacity of the active element of the filter which is relatively large; and this detracts considerably from the practicality of such a device so far as the filtering of input current harmonics of static converters is concerned.

In accordance with the present invention, the volt-ampere rating of the active element of an active power filter can be materially reduced by connecting the active element in series with a reactive element across the input terminals of a static power converter. The reactive element passes the harmonic currents of the static converter and, at the same time, presents a relatively high impedance to the fundamental component of current such that the fundamental voltage is dropped across the reactive element and not the active power filter which can now have a much lower volt-ampere rating.

Specifically, there is provided in an electrical power system for supplying power from an alternating current source section to a static converter or the like the combination of an active voltage generator in series with a reactive element interposed in parallel between the alternating current source and the converter with the reactive element being such that it supports the full-line voltage and prevents the active harmonic voltage generator in series with it from being exposed to this voltage. The active filter preferably comprises a controllable generator powered from the alternating current source and responsive to a variable of an electrical ripple on the fundamental waveform for generating a synthetic ripple equivalent to the electrical ripple. This synthetic ripple opposes and substantially eliminates the electrical ripple without any substantial power loss. Thus, the invention provides a means for obtaining the advantages of an active power filter in installations, such as static power converters, which operate at relatively high power ratings.

The above and other objects and features of the invention will become apparent from the following detailed description taken in connection with the accompanying drawings which form a part of this specification, and in which:

FIG. 1 conceptually illustrates the basic active filter utilized in the invention;

FIG. 5 is a diagrammatic circuit illustrating a control system for the active filtering system of the invention; and FIG. 6 comprises waveforms illustrating the operation of the circuit of FIG. 5.

Figure 1:
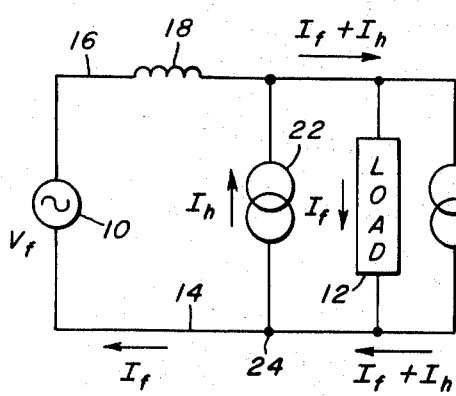

With reference now to the drawings, and particularly to FIG. 1, the basic active filter of the invention is conceptually shown. It includes a source 10 which generates a fundamental component of voltage $V_f$. The voltage source 10 is connected to a load 12 through leads 14 and 16, the lead 16 including an inductor 18 which may represent the internal inductance of the source 10. Assuming that the load 12 is a static power converter, for example, there will be generated through it a ripple current $I_h$. This is diagrammatically illustrated as being generated by a current generator 20. The ripple current $I_h$ would normally flow through the source 10. However, by placing a synthetic current generator 22 across the leads 14 and 16 between the source and load, and by causing the current generator to generate a synthetic ripple $I_h$ 180° out of phase with the actual ripple generated by the load, then no ripple current will flow through the source 10. That is, in accordance with Kirchhoff's law, current flowing to point 24 will be $I_f + I_h$; but since the current generator causes the current $I_h$ to flow away from point 24, the only current which flows back to the source 10 is the fundamental current $I_f$.

Figure 2:
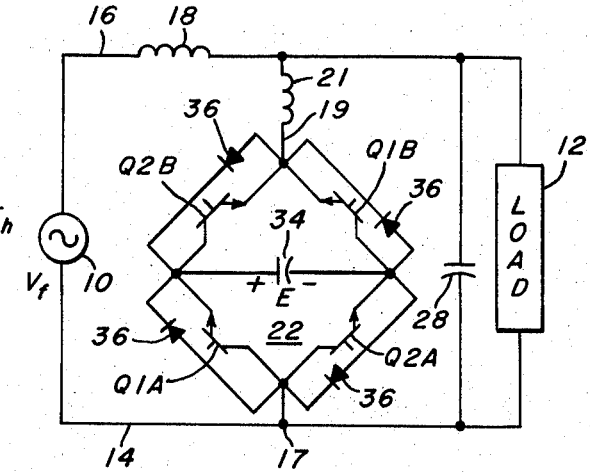
FIG. 2 illustrates a possible practical realization of the conceptual filter shown in FIG. 1 using a capacitor as an energy storage device.

The circuit shown in FIG. 1, of course, is purely theoretical. A possible practical realization of the theoretical circuit shown in FIG. 1 is illustrated in FIG. 2 wherein elements corresponding to those of FIG. 1 are identified by like reference numerals. It includes a bridge circuit (constituting the active element 22) having two sets of switches Q1A, Q1B and Q2A, Q2B. A capacitor 34 charged to the voltage E with the polarity indicated is connected between two terminals of the bridge and acts as a voltage source. Additionally, diodes 36 are connected in shunt with each of the transistors, enabling the capacitor to absorb energy from the input source.

Assuming that the direct current voltage across capacitor 34 has sufficient magnitude, the theoretical circuit of FIG. 1 can be realized by alternately connecting the charged capacitor, via opposite pairs of switches of the bridge circuit (i.e., Q1A, Q1B and Q2A, Q2B), across points 17 and 19 for controlled intervals of time. In effect, by controlling or modulating the switch closures, the waveform of the current flowing out of point 17 can be made to follow that of the harmonic current $I_h$ drawn by the load. Of course, this process also produces its own harmonics. However, by operating the switches at a sufficiently high rate, the frequencies of the switching harmonics thus produced can be kept as high as desired. It is, therefore, enough to add a relatively small passive filter, such as inductor 21 and capacitor 28 in FIG. 2, to absorb these unwanted switching harmonics.

The difficulty with using an active harmonic voltage generator such as that shown in FIG. 2 by itself across the input to a static power converter is that the required volt-ampere handling capacity of the active element of the filter must be relatively large. That is, it must be rated to handle the full-line voltage; and this detracts from the practicability of the device. In accordance with the present invention, therefore, the active harmonic voltage generator is connected across the input terminals of the converter or load in series with an element which presents a relatively high impedance to the fundamental component of current. Thus, the fundamental component of the line voltage is developed across the series element; and the active voltage generator handles only the relatively low level harmonic voltage.

Figure 3:
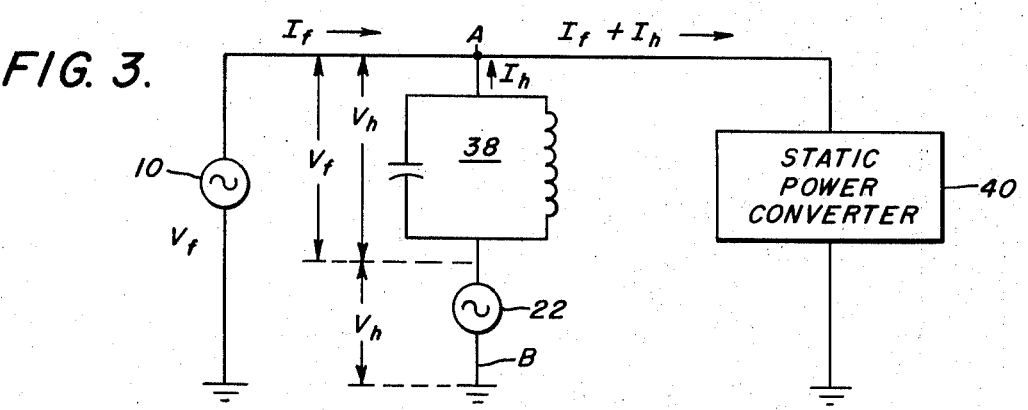
FIG. 3 illustrates one embodiment of the present invention employing an active filter and incorporating a reactive element in series with it whereby the volt-ampere rating of the active generator itself can be reduced.

One basic form of the proposed arrangement of the present invention is shown in FIG. 3. For purposes of explaining the basic principle, assume that a parallel L-C circuit 38 is connected in series with an active harmonic voltage generator 22, such as the generator of FIG. 2. Assume, further, that the L-C circuit 38 is tuned precisely to the line frequency; although, in practice, this need not necessarily be the case. The function of the parallel tuned circuit 38 is to support the full-line voltage $V_f$, thereby preventing the active harmonic voltage generator 22 from being exposed to this voltage and enabling its volt-ampere rating to be reduced. The active harmonic voltage generator 22 produces a voltage which is just sufficient to induce all the harmonic current $I_h$ of a static power converter 40 to flow through it. Thus, the harmonic voltage $V_h$ produced by generator 22 just balances the harmonic voltage $V_h$ developed across the parallel tuned circuit 38 due to the flow of harmonic current $I_h$ through it. As a result, the only component of voltage developed across points A-B is the fundamental component $V_f$, although essentially none of this appears across generator 22; and the only current flowing in the input line is the fundamental component $I_f$. Note that the impedance of the line itself is of no relevance; the magnitude of the voltage delivered by the harmonic voltage generator is determined only by the amplitude of the harmonic currents (which is independent of the line impedance) and the impedance of the parallel tuned circuit to the harmonic current.

If it is assumed that the peak harmonic voltage developed across the tuned circuit is the algebraic sum of the two lowest order harmonic voltages, then it can be shown that the peak voltage delivered by the harmonic voltage generator is given approximately by:

$$V_h = (2V_f/kp^2)$$

where $p$ is the pulse number of the converter, $V_h$ is the peak harmonic voltage, $V_f$ is the peak fundamental voltage, and $k$ is the ratio of the fundamental component of current consumed by the capacitor in the L-C network 38 of FIG. 3 to the fundamental component consumed by the converter (i.e., the ratio of capacitor kVA to converter kVA).

On the other hand, if the L-C network is not included in the circuit of FIG. 3, the active harmonic voltage generator 22 must be capable of supporting the full peak line voltage $V_f$ of the converter, and of carrying harmonic currents of the converter as well. Assuming that the peak value of the harmonic currents can be approximated as being the sum of the peak values of the two lowest order terms, then the peak volt-ampere product appearing across the generator 22 without the L-C circuit 38 can be shown to be approximately $2(V_fI_f)/p$. Therefore, by including the L-C circuit 38, the peak voltage seen by the generator 22 has been reduced by a factor of $2/kp^2$ as compared with an arrangement wherein the L-C circuit is not included. For example, if $k = 0.3$, then for a six-pulse converter the voltage reduction factor would be 0.185 (i.e., a 5.4 to 1 reduction in voltage). For a 12-pulse converter, the corresponding voltage reduction factor would be 0.0463 (i.e., a 21.6 to 1 reduction in voltage).

Actually, it is not necessary to use a parallel tuned circuit such as that of FIG. 3 as the passive element in series with the active harmonic voltage generator. An alternative scheme would be to use only a capacitor, such as capacitor 41 shown in FIG. 4. This has the drawback of allowing a relatively large fundamental component of current $I_{fc}$ to flow in the harmonic voltage generator, in addition to the harmonic components, thereby increasing its required current handling capability. However, at the same time, it has the advantage that the capacitor now draws a leading current from the line, and thus serves the dual purpose of being a component of the active filter and of correcting the line power factor. For high power converters, which in any case require line power factor correction, this is an attractive arrangement.

Figure 4:
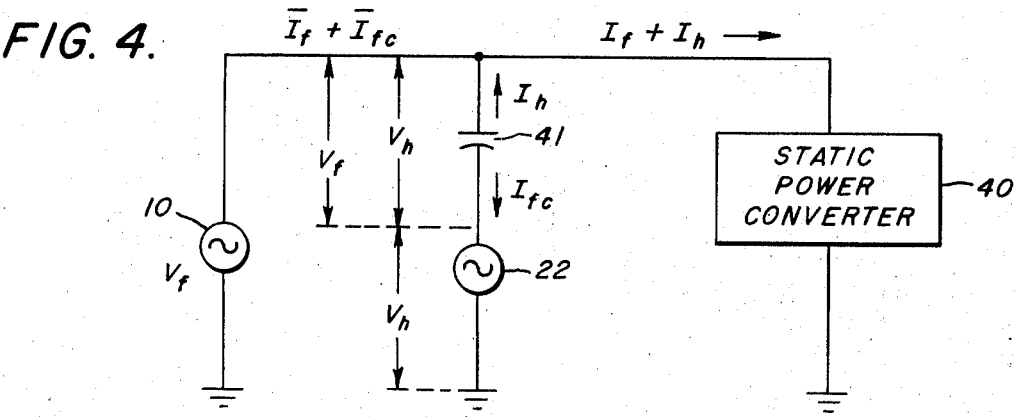
FIG. 4 is a conceptual illustration of an alternative embodiment of the invention.

With the capacitor arrangement of FIG. 4, the voltage reduction factor is the same as with the arrangement of FIG. 3. However, as has been explained, the current carried by the harmonic voltage generator is greater. It can be shown that the "multiplication factor" for the peak current of the harmonic voltage generator 22 in FIG. 4, as compared with the arrangement of FIG. 3, is approximately $1 + kp/2$. This assumes that the peak current handled by the harmonic voltage generator is the algebraic sum of the peaks of the two lowest order harmonic components plus the peak of the fundamental component. The "multiplication factor" for RMS current would be less than the above factor for peak current. The product of the peak voltage and peak current handled by the harmonic voltage generator is approximately $(2/p^2 + 4/kp^3)$ times the product of the peak fundamental voltage and the peak fundamental current of the main power converter.

Some specific examples will serve to illustrate the practical significance of the above relationships. Assume a 12-pulse converter with $k = 0.1$. Then the peak voltage reduction factor is 0.14; and the peak current multiplication factor is 1.6. Thus, the required peak volt-ampere rating of the harmonic voltage generator is $1.6 \times 0.14 = 0.22$ times that of the active element of FIG. 2; and the absolute value of the peak volt-ampere of the harmonic voltage generator is 3.7 percent of the peak fundamental volt-amperes of the converter. Of course, the active harmonic voltage generator need not necessarily be a static device. It will be possible, for example, to conceive of using synchronous machines to perform this function. Either a single synchronous machine, with appropriate modulation of its excitation, or a number of machines connected in series, each producing a given harmonic frequency, would be theoretically feasible.

A possible control arrangement for the basic circuit of FIG. 3 is shown in simplified form in FIG. 5. For purposes of illustration, one terminal of the static power converter 40 is shown grounded, while the other terminal is connected to a voltage source 10 which produces a fundamental component of voltage $V_f$. The current flowing between the source 10 and point 44, therefore, is the current $I_f + I_{fc}$ comprising only the fundamental component of current and that component of the fundamental current $I_{fc}$ flowing through the active element 22. However, between point 44 and the static power converter, the current comprises $I_f + I_h$. Of course, in order to prevent the harmonic current $I_h$ from flowing through the source 10, it is necessary for the active harmonic voltage generator 22, corresponding to that of FIG. 2, to produce a current $I_h$ flowing into the point 44. In series with the voltage generator 22 is a capacitor 41 which, as explained above, absorbs essentially the full-line voltage $V_f$ such that it does not appear across the active generator 22. The signal or voltage across the capacitor 41 appears as waveform A in FIG. 6 and comprises, in essence, the fundamental voltage $V_f$ having superimposed thereon the harmonic voltage $V_h$ due to the flow of harmonic current $I_h$. This is passed through a low power filter 46 which filters out the fundamental component $V_f$, leaving only the harmonic component $V_h$ which may appear, for example, as waveform B in FIG. 6. Since it is desired to generate fictitious harmonic ripple voltage which opposes the ripple voltage $V_h$ developed across capacitor 41, it is necessary to invert the output of the low power filter 46 in inverter 48. This, then, is applied to summing point 50 where it is combined with the output of a variable gain amplifier 52.

The purpose of the variable gain amplifier 52 is to replenish power losses within the active harmonic voltage generator 22 itself. However, for purposes of explanation, it will be assumed initially that the active harmonic generator 22 is lossless, in which case the output of the variable gain amplifier 52 will be zero and the output of the inverter 48 will be applied directly to summing point 54 where it is combined with the output of a high frequency carrier generator 56. The output of the high frequency carrier generator 56 may appear as waveform C in FIG. 6 and comprises a series of more or less sawtooth waveforms. When the waveform C is combined with one cycle of the harmonic voltage $V_h$ from inverter 48, therefore, a waveform such as waveform D of FIG. 6 will result. This, then, is applied to a bistable modulator 58, similar in operation to a Schmitt trigger circuit. That is, it will switch from one stable state to the other whenever the level of the input waveform rises above a predetermined value and will remain in that stable state until the waveform falls below the predetermined value, whereupon the modulator 58 will switch from one stable state to the other. The two outputs of the bistable modulator are then applied through driver circuits 60 and 62 to transistors Q1A, Q1B and Q2A, Q2B, respectively.

Assuming that the predetermined voltage level at which the bistable modulator 58 switches from one stable state to the other is the level 64 (i.e., zero) on waveform D of FIG. 6, then the resulting waveform appearing across the voltage generator 22 will appear as waveform E in FIG. 6. It comprises a pulse width modulated waveform, the mean value of which is indicated by waveform 66. It will be appreciated that this corresponds to the harmonic voltage developed across capacitor 41 and resulting from the harmonic current $I_h$. Since the waveform fed to the bistable modulator 58 has been inverted, the mean value 66 will effectively oppose and cancel the harmonic voltage $V_h$ developed across capacitor 41, thus insuring that all the harmonic current $I_h$ drawn by the static power converter 40 flows through the capacitor 41.

Under the ideal conditions just described, it will be enough to charge the capacitor 34 initially from the input source to a sufficient magnitude to insure proper filtering action. The circuit, however, is not ideal. Thus, a part of the initially stored energy in the capacitor 34 will be progressively used up by losses. To counteract the losses of the generator 22 and thus to maintain the charge on the capacitor 34, energy must be continuously supplied from the input source. This is achieved by applying a relatively small fundamental component of reference voltage to the bistable modulator from the variable gain amplifier. This fundamental component of reference voltage is derived from the source voltage $V_f$ through the inverting integrator, and thus it is virtually in-phase with the fundamental component of current $I_{fc}$ flowing through capacitor 41. The magnitude of this voltage is regulated by the variable gain amplifier in accordance with the error between a reference voltage E, representing the desired voltage on capacitor 34, and the actual voltage on capacitor 34. Thus, the voltage waveform generated at terminal 17 of the voltage generator 22 is made to contain a just sufficient component at fundamental frequency to absorb the correct amount of fundamental power to replenish the losses of the circuit.

Although the invention has been shown in connection with certain specific examples, it will be readily apparent to those skilled in the art that various changes in form and arrangement of parts may be made to suit requirements without departing from the spirit and scope of the invention. Thus, the voltage generator 22 could take any known form; for high power applications, a preferred embodiment of this could be a conventional commutated pulse-width modulated inverter using thyristors, or a conventional naturally commutated cycloconverter, such as is described in the book by B.R. Pelly entitled "Thyristor Phase-Controlled Converters and Cycloconverters," John Wiley & Sons, Inc., 1971.

It will also be apparent that whereas the foregoing description has been in relation to single-phase systems, the basic principles are directly applicable to polyphase systems.

What is claimed is:

1. In an electrical power system for supplying power from an electrical source section to a load section and wherein said load section generates an electrical ripple to which the source section is subject in the absence of filtering, the combination of power conductors connecting said source section to said load section, an active filter interposed between said sections and comprising a controllable generator connected across said power conductors and responsive to a variable of said electrical ripple for generating a synthetic ripple corresponding to said electrical ripple, said synthetic ripple opposing and substantially eliminating the effect of the electrical ripple on said source section, and a reactive element connected in series with said controllable generator across said power conductors, the reactive element having an impedance value with respect to said source section such that it supports substantially the full-line voltage and prevents the controllable generator in series with it from being exposed to substantially the full-line voltage, whereby the volt-ampere rating of said controllable generator may be reduced.

2. The power system of claim 1 including means for powering said controllable generator from said source section.

3. The power system of claim 1 wherein said reactive element comprises an L-C circuit substantially tuned to the line frequency of power supplied from said source section.

4. The combination of claim 1 wherein said reactive element comprises a capacitor which presents a high impedance to power supplied from said source section at the line frequency of said source section.

5. The power system of claim 1 wherein said controllable generator comprises an electric energy storage means, and switching means operable in a first mode for connecting said storage means to increase said synthetic ripple magnitude and in a second mode for connecting said storage means to decrease said synthetic ripple magnitude, whereby the average value of said synthetic ripple is regulated to the same value as said electrical ripple.

6. The power system of claim 5 wherein said energy storage means comprises a capacitor.

7. The power system of claim 6 wherein said capacitor is arranged and connected with said switching means in a bridge configuration connected in series across said power conductors with said reactive element, and means controlling said switching means to regulate said synthetic ripple to essentially the same value as said electrical ripple.

8. The power system of claim 5 wherein said electrical source section generates a fundamental voltage $V_f$ and said load section generates a ripple voltage $V_h$, said means for controlling the switching means including apparatus for filtering the voltage $V_h$ from the fundamental voltage $V_f$ having the ripple voltage $V_h$ superimposed thereon, means for inverting the filtered ripple voltage, and means responsive to said inverted ripple voltage for generating an inverted synthetic ripple essentially equal to but opposite in phase to the ripple voltage generated by said load section.

* * * * *